United States Patent
Bostick et al.

(10) Patent No.: US 8,370,354 B2
(45) Date of Patent: Feb. 5, 2013

(54) ACCELERATION OF LEGACY TO SERVICE ORIENTED (L2SOA) ARCHITECTURE RENOVATIONS

(75) Inventors: James E. Bostick, Cedar Park, TX (US); John M. Ganci, Jr., Cary, NC (US); Craig M. Trim, Sylmar, CA (US); John P. Kaemmerer, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 12/826,979

(22) Filed: Jun. 30, 2010

(65) Prior Publication Data

US 2012/0005202 A1    Jan. 5, 2012

(51) Int. Cl.
*G06F 17/30* (2006.01)
(52) U.S. Cl. .................. 707/736; 707/730; 707/756
(58) Field of Classification Search .................. None
See application file for complete search history.

(56) References Cited

U.S. PATENT DOCUMENTS

| | | | | |
|---|---|---|---|---|
| 5,574,837 | A * | 11/1996 | Clark et al. ................. | 345/440 |
| 6,106,571 | A | 8/2000 | Maxwell | |
| 6,269,474 | B1 * | 7/2001 | Price ......................... | 717/104 |
| 6,467,081 | B2 | 10/2002 | Vaidyanathan et al. | |
| 6,502,233 | B1 | 12/2002 | Vaidyanathan et al. | |
| 6,556,218 | B1 | 4/2003 | Alcorn | |
| 6,668,255 | B2 | 12/2003 | Mielenhausen | |
| 6,698,013 | B1 | 2/2004 | Bertero et al. | |
| 6,704,730 | B2 * | 3/2004 | Moulton et al. ............. | 1/1 |
| 6,757,893 | B1 * | 6/2004 | Haikin ........................ | 717/170 |
| 6,851,105 | B1 | 2/2005 | Coad et al. | |
| 6,964,036 | B2 | 11/2005 | Bates et al. | |
| 6,993,013 | B1 | 1/2006 | Boyd | |
| 6,993,487 | B2 | 1/2006 | Bluvband | |
| 7,103,885 | B2 | 9/2006 | Foster | |
| 7,114,149 | B2 | 9/2006 | Aptus et al. | |
| 7,222,333 | B1 | 5/2007 | Mor et al. | |
| 7,225,157 | B2 | 5/2007 | Howard et al. | |
| 7,321,988 | B2 * | 1/2008 | Guo et al. ................... | 714/38.11 |
| 7,401,031 | B2 | 7/2008 | Hughes | |
| 7,412,699 | B2 | 8/2008 | Francis et al. | |
| 7,454,744 | B2 | 11/2008 | Bhogal et al. | |
| 7,461,368 | B2 | 12/2008 | White | |
| 7,496,906 | B2 * | 2/2009 | Black-Ziegelbein et al. . | 717/145 |
| 7,500,221 | B2 | 3/2009 | Baumann | |
| 7,500,222 | B2 * | 3/2009 | Bates et al. ................. | 717/111 |
| 7,519,621 | B2 | 4/2009 | Harik | |

(Continued)

FOREIGN PATENT DOCUMENTS

EP    0567722 A2    11/1993

OTHER PUBLICATIONS

Lawrie et al., "Extracting Meaning from Abbreviated Identifiers", IEEE, 2007, pp. 213-222.*

(Continued)

*Primary Examiner* — Debbie Le
(74) *Attorney, Agent, or Firm* — Yee & Associates, P.C.; Arthur J. Samodovitz

(57) ABSTRACT

A method, system, and program product are presented for identifying similar functional segments of code to a service oriented architecture transition team. The method, system and program product comprise identifying, by a processor of a computer, a number of functionally equivalent segments in a number of lines of code by analyzing tag files associated with each of a number of functional segments in the number of lines of code.

18 Claims, 6 Drawing Sheets

U.S. PATENT DOCUMENTS

| | | | |
|---|---|---|---|
| 7,526,753 | B2 | 4/2009 | Spencer et al. |
| 7,542,958 | B1 * | 6/2009 | Warren et al. ............. 706/48 |
| 7,568,109 | B2 | 7/2009 | Powell, Jr. et al. |
| 7,627,851 | B2 | 12/2009 | Lotter |
| 7,665,061 | B2 | 2/2010 | Kothari et al. |
| 7,721,253 | B2 | 5/2010 | Tatsumi et al. |
| 7,934,205 | B2 * | 4/2011 | Bera ...................... 717/137 |
| 2001/0042045 | A1 | 11/2001 | Howard et al. |
| 2002/0029231 | A1 | 3/2002 | Aptus et al. |
| 2002/0095657 | A1 | 7/2002 | Vaidyanathan et al. |
| 2003/0221186 | A1 | 11/2003 | Bates et al. |
| 2004/0261059 | A1 | 12/2004 | Spencer et al. |
| 2005/0005258 | A1 | 1/2005 | Bhogal et al. |
| 2005/0108686 | A1 | 5/2005 | White |
| 2005/0166193 | A1 | 7/2005 | Smith et al. |
| 2005/0229156 | A1 | 10/2005 | Baumann |
| 2005/0235247 | A1 | 10/2005 | Francis et al. |
| 2005/0251536 | A1 | 11/2005 | Harik |
| 2005/0262056 | A1 | 11/2005 | Hamzy et al. |
| 2006/0015856 | A1 | 1/2006 | Lotter |
| 2006/0218523 | A1 | 9/2006 | Tatsumi et al. |
| 2007/0006152 | A1 | 1/2007 | Ahmed et al. |
| 2007/0180455 | A1 | 8/2007 | Mariani |
| 2007/0250810 | A1 | 10/2007 | Tittizer et al. |
| 2007/0299825 | A1 | 12/2007 | Rush et al. |
| 2008/0228762 | A1 * | 9/2008 | Tittizer et al. ............. 707/5 |
| 2009/0222429 | A1 * | 9/2009 | Aizenbud-Reshef et al. .... 707/5 |
| 2010/0333079 | A1 * | 12/2010 | Sverdlov et al. ............. 717/168 |
| 2011/0010353 | A1 * | 1/2011 | Wei et al. ..................... 707/706 |

OTHER PUBLICATIONS

Chen et al., "CVSSearch: Searching Through Source Code Using CVS Comments," IEEE International Conference on Software Maintenance, Florence, Italy, Nov. 7-9, 2001, abstract, 1 page.

Hui et al., "The Hardware Probe Connection Research of CodeTEST Based on ARM," IFITA '10, 2010 International Forum on Information Technology and Applications, Kunming, China, Jul. 16-18, 2010, abstract, 1 page.

Long, "C# Documenting and Commenting," http://www.codeproject.com/Articles/3009/C-Documenting-and-Commenting?display=Print, original posting Oct. 9, 2002, Article dated Jan. 20, 2003, 7 pages.

Office Action regarding U.S. Appl. No. 11/379,390, dated Nov. 20, 2009, 29 pages.

Final Office Action regarding U.S. Appl. No. 11/379,390, dated May 26, 2010, 10 pages.

Office Action regarding U.S. Appl. No. 12/130,830, dated Sep. 29, 2011, 12 pages.

Final Office Action regarding U.S. Appl. No. 12/130,830, dated May 9, 2012, 18 pages.

Notice of Allowance regarding U.S. Appl. No. 12/130,830, dated Aug. 15, 2012, 9 pages.

* cited by examiner

400

| | 410 | 420 | 440 | 450 | |
|---|---|---|---|---|---|
| | SEGMENT A | SEGMENT B | SEGMENT N | STRENGTH | |
| 411 | 17943 | 2891004 | 421<br>5321118 | 441<br>100% | 451 |
| 412 | 794362 | 672498 | 422<br>421896 | 442<br>100% | 452 |
| 413 | 592118 | 281693 | 423<br>6289114 | 98% | 453 |
| 414 | 92743 | 9317104 | 424   443 | 96% | 454 |
| 415 | 111458 | 3181065 | 426 | 94% | 455 |
| 416 | 734694 | 1911553 | 428 | 94% | 456 |
| 417 | 872145 | 1884427 | 429   444 | 93% | 457 |
| 418 | $A_N$ | $B_N$ | $N_N$ | X% | 458 |

ACCELERATION OF LEGACY TO SERVICE ORIENTED (L2SOA) ARCHITECTURE RENOVATIONS

BACKGROUND

1. Field

The disclosure relates generally to data processing systems and more specifically to transitional techniques for migrating legacy systems to a service oriented architecture.

2. Description of the Related Art

Many businesses have large amounts of computer code accumulated over years of adaptation and reconfiguration. Such businesses often desire to transition to a service oriented architecture to improve speed, service, and costs of their computing systems. The old computing system is often referred to as a legacy system. To service a business desiring to transition from a legacy system, a service oriented architecture provider establishes a transition team in order to prepare for the migration of services from the old system to the new system in the service oriented architecture environment.

One role of a transition team is to identify duplicate business services amidst millions of lines of code. Moreover, candidate business services may be located having large amounts of duplicate functionality, in whole or in part, throughout the legacy system. These candidate business services may be replaced by vastly more efficient programs and consolidated into a single location. The identification of duplicate business services amidst the huge amounts of code is expensive in terms of time and resources.

Therefore, it would be desirable to have a method, apparatus, and computer program code that may overcome one or more of the issues described above, as well as other possible issues.

SUMMARY

According to one embodiment of the present invention, a method, system, and computer program product are presented for identifying similar functional segments of code to a service oriented architecture transition team. The method, system and computer program product comprise identifying, by a processor of a computer, a number of functionally equivalent segments in a number of lines of code by analyzing tag files associated with each of a number of functional segments in the number of lines of code.

BRIEF DESCRIPTION OF THE SEVERAL VIEWS OF THE DRAWINGS

The novel features believed characteristic of the illustrative embodiments are set forth in the appended claims. The illustrative embodiments, however, as well as a preferred mode of use, further objectives, and advantages thereof, will best be understood by reference to the following detailed description of an illustrative embodiment of the present disclosure when read in conjunction with the accompanying drawings, wherein:

FIG. 4 is a table of semantic similarity in accordance with the illustrative embodiments;

DETAILED DESCRIPTION

Figure 1:
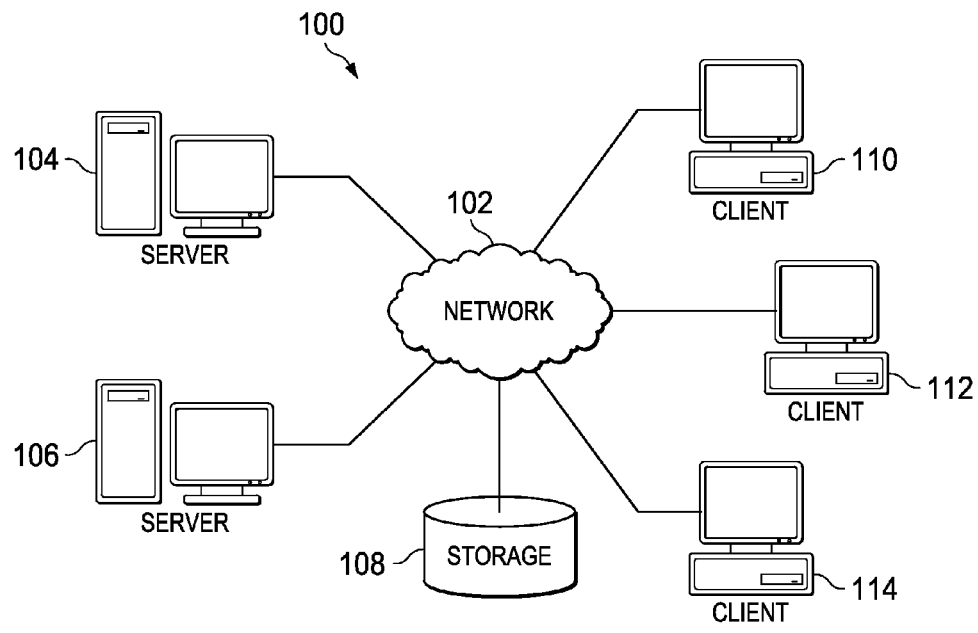
FIG. 1 is a computer network in which an illustrative embodiment may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable data storage medium(s) may be utilized. The computer-usable or computer-readable data storage medium may be, for example but not limited to, an electronic, magnetic, optical, or semiconductor system, apparatus, or device. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable data storage medium may be any medium that can store the program for use by or in connection with the instruction running system, apparatus, or device. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which run on the computer or other programmable apparatus provide processes for implementing the functions/acts specified in the flowchart and/or block diagram block or blocks.

Figure 2:
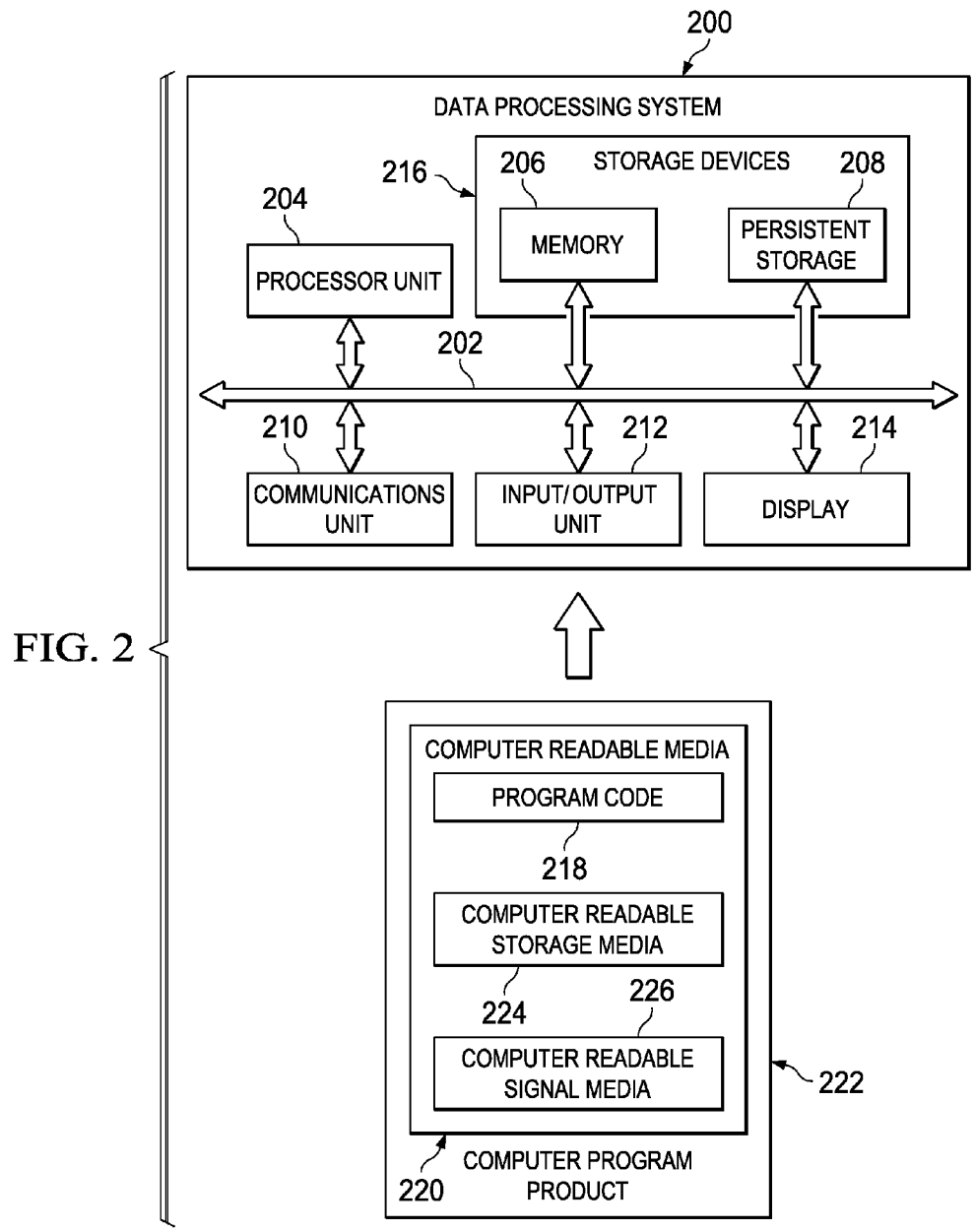
FIG. 2 is a data processing system in which an illustrative embodiment may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to run instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The medium used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206.

These instructions are referred to as program code, computer usable program code, or computer readable program code that may be read and ran by a processor in processor unit 204. The program code, in the different embodiments, may be embodied on different physical or computer readable storage medium, such as memory 206 or persistent storage 208.

Program code 218 is located in a functional form on computer readable medium 220 that is selectively removable and may be loaded onto or transferred to data processing system 200 for running by processor unit 204. Program code 218 and computer readable medium 220 form computer program product 222. In one example, computer readable medium 220 may be computer readable storage medium 224 or computer readable signal medium 226. Computer readable storage medium 224 may include, for example, an optical or magnetic disc that is inserted or placed into a drive or other device that is part of persistent storage 208 for transfer onto a storage device, such as a hard drive, that is part of persistent storage 208. Computer readable storage medium 224 also may take the form of a persistent storage, such as a hard drive, a thumb drive, or a flash memory that is connected to data processing system 200. In some instances, computer readable storage medium 224 may not be removable from data processing system 200.

Alternatively, program code 218 may be transferred to data processing system 200 using computer readable signal medium 226. Computer readable signal medium 226 may be, for example, a propagated data signal containing program code 218. For example, computer readable signal medium 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable medium also may take the form of non-tangible medium, such as communications links or wireless transmissions containing the program code.

In some illustrative embodiments, program code 218 may be downloaded over a network to persistent storage 208 from another device or data processing system through computer readable signal medium 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable medium 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As used herein, the term "functional segment" means a subroutine, a method, or a function ("subroutine") that is automatically assigned a set of semantic tags. As used herein, "a number" means one or more of an item.

Figure 3:
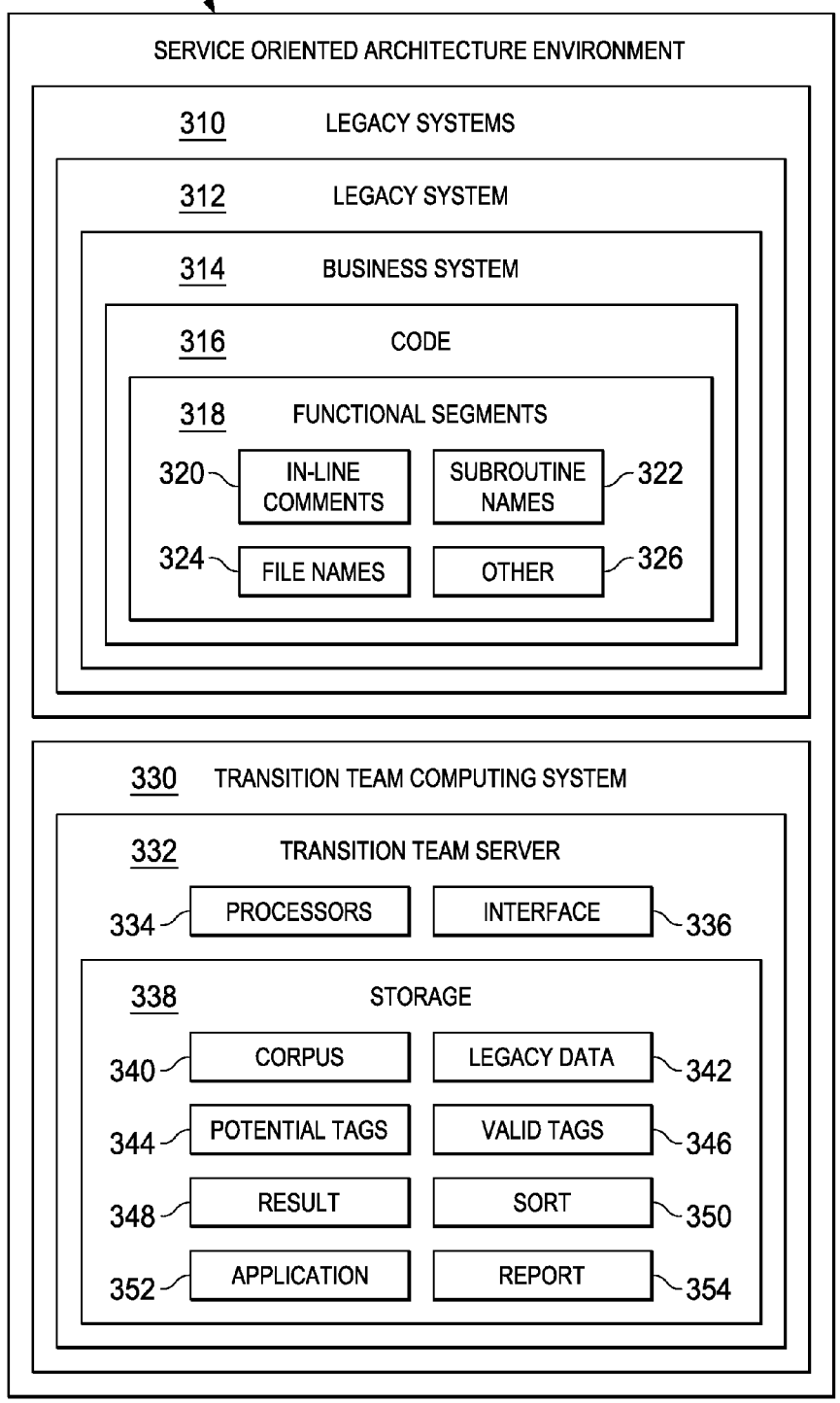
FIG. 3 is a service oriented architecture environment in which an illustrative embodiment may be implemented.

With reference now to FIG. 3, a service oriented architecture environment is disclosed in which an illustrative embodiment may be implemented. Service oriented architecture environment 300 may comprise legacy systems 310 and transition team computing system 330. Legacy systems 310 may comprise a number of legacy systems such as legacy system 312. Legacy system 312 may comprise a number of business systems 314 each having code 316. Code 316 may have functional segments 318. Each functional segment may have in-line comments 320, subroutine names 322, file names 324, and other components 326. Transition team computing system 330 may comprise transition team server 332. The illustrative embodiments recognize and take into account that a transition team may have its own computing system and permission to securely access a legacy systems code. Transition team server 332 may comprise a number of processors 334, interface 336, and storage 338. Interface 336 may provide secure access to a legacy system code, applications necessary for operations involving the legacy code, and configuration of files and reports. Applications necessary for operations involving the legacy system code may be those in the illustrative examples presented in FIGS. 5-7. Storage 338 may comprise a number of files, and the number of files may be corpus 340, legacy data 342, potential tags 344, valid tags 346, result 348, sort 350, application 352, and report 354. The number of files may be those necessary for the operations conducted on the legacy code in the illustrative examples of FIGS. 5-7.

The illustrative embodiments recognize and take into account a mechanism for finding similar functional segments with degrees of similarity in source code that may be automated using semantic analysis. An algorithm may be implemented using a combination of in-line code comments, subroutine names and file names and other information. In an embodiment, all existing data may be related to a given segment as candidate data for semantic analysis, and therefore, may not be limited to only in-line code comments, subroutine names and file names. The illustrative embodiments recognize and take into account that such an algorithm may not be limited to a particular language and may operate consistently and effectively across all types of languages, including Visual Basic, COBOL and Java.

Referring now to FIG. 4, a table of semantic similarity is disclosed in accordance with the illustrative embodiments. Table 400 is an illustrative example of a report format such as may be in report file 354 in FIG. 3. The illustrative embodiments recognize and take into account that a report may be configured in any format suitable to the transition team. Table 400 may be produced by application 352 in FIG. 3. Table 400 may have rows 410 through 418 and columns 410 through 450. Column 410 may contain a list of functional code segments identified by a unique identification number. In an illustrative example, functional code segment identifier 17943 is displayed in row 411 and column 410. Column 410 may contain any number of functional code segments, each having its own unique identifier. Column 410 may have title Segment A located in column 410 and row 410. Functional code elements displayed in column 410 may have a last functional code segment designated as $A_N$. In like manner, column 420 may have title Segment B and may list functional code segments. In an example, row 414 and column 420 display unique identifier 9317104. Column 440 may have title Segment N. In an example, Segment N represents a number to show that there may be a number of columns represented by N and not only the three columns listing functional code segment identifiers as shown in FIG. 4.

In this example, row 411 may show that there are three code segments having a semantic similarity and a numerical value for the similarity is displayed in column 450 and row 411. In the illustrative example, cell 411 may contain identifier 17943, cell 421 may contain unique identifier 2891004, and cell 441 may contain identifier 5321118. Cell 451 may display a numerical value for a semantic similarity between the functional code segments represented by unique identifiers, 17943, 2891004 and 5321118. In this example the semantic similarity is one hundred percent shown as 100% in cell 451. Similarly, unique identifiers 794362, 672498, and 421896 in row 412 have a semantic similarity of one hundred percent show as 100% in cell 452.

Unique identifiers 592118, 281693, and 6289114 in row 413 have a semantic similarity of ninety eight percent shown as 98% in cell 453. Row 414 has only two unique identifiers, 92743 and 9317104 representing functional segments with a ninety six percent semantic similarity shown as 96% in cell 454. Row 415 has unique identifiers 734694 and 1911553 representing functional code segments having a semantic similarity of ninety four percent shown as 94% in cell 456. Row 417 has identifiers 872145 and 1884427 representing functional code segments having a semantic similarity of ninety three percent shown as 93% in cell 457. In the illustrative example, row 418 represents row N of table 400 to depict the last row with X % displayed in cell 458. As can be seen by examining the example of table 400, the semantic analysis values are ranked in table 400 from highest to lowest.

The illustrative embodiments recognize and take into account that a method for identifying similar functional segments of code to a service oriented architecture transition team may comprise identifying, by a processor of a computer, a number of functionally equivalent segments in a number of lines of code by analyzing tag files associated with each of a number of functional segment in the number of lines of code. In the illustrative embodiments, such a process may be illustrated in FIGS. 5-7.

Figure 5:
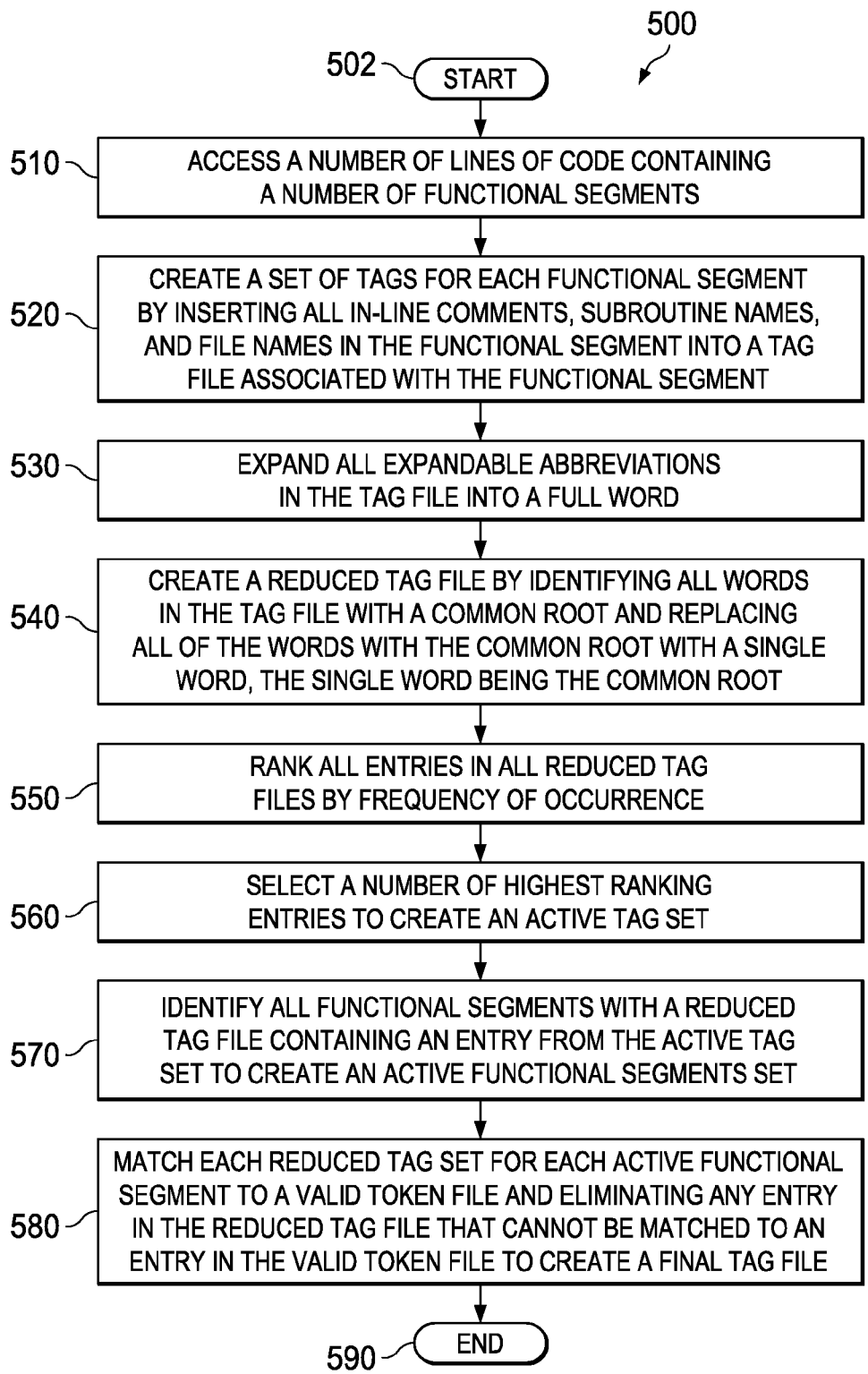
FIG. 5 is a flowchart of a preparation process in accordance with the illustrative embodiments.

Referring to FIG. 5, a flowchart of a preparation process is disclosed in accordance with the illustrative embodiments. Preparation process 500 may be part of application 352 in storage 338 of transition team server 332 in FIG. 3. In the example of FIG. 5, preparation process 500 starts (step 502) and accesses a number of lines of code containing a number of functional segments (step 510). The functional segments may be functional segments 318 in legacy system 312 in FIG. 3 and may be stored in legacy data 342 of transition team server 332 in the illustrative example of FIG. 3. Preparation process 500 creates a set of tags for each functional segment by inserting all in-line comments, subroutine names, and file names in the functional segment into a tag file associated with the functional segment (step 520). In-line comments, subroutine names, and file names may be in-line comments 320, subroutine names 322, file names 324 in the illustrative example of FIG. 3.

In an illustrative example, a tag file may be:
{calc, rpt, queries, dlg, JP, chetan}

The tag file may be stored in potential file 344 in the illustrative example of FIG. 3. Preparation process 500 expands all expandable abbreviations in the tag file into a full word (step 530). In an illustrative example, the tag file may now appear as:
{calculation, report, queries, dialog, JP, chetan}

Preparation process 500 creates a reduced tag file by identifying all words in the tag file with a common root and replacing all of the words with the common root with a single word, the single word being the common root (step 540). In an illustrative example, the tag file above "reports, reported, and reporting" becomes "report." The tag file may now appear as:
{calculation, report, query, dialog, JP, chetan}

Preparation process 500 ranks all entries in all reduced tag files by frequency of occurrence (step 550). Preparation process 500 selects a number of highest ranking entries to create an active tag set (step 560). Preparation process 500 identifies all functional segments with a reduced tag file containing an entry from the active tag set to create an active functional segments set (step 570).

Preparation process 500 matches each reduced tag set for each active functional segment to a valid token file and eliminates any entry in the reduced tag file that cannot be matched to an entry in the valid token file to create a final tag file (step 580) and stops (step 590). In an example, the final tag file may be:
{calculation, report, query, dialog}

A valid token file may be constructed by copying large amounts of literature to a file and then eliminating duplicate words and proper names. A valid token file may be designed to identify English words so that by comparison with the final tag file, all non-English words may be eliminated from the final tag file. A valid token file may reside in corpus file 340 in storage 338 of transition team server 332 in the illustrative example of FIG. 3. The final tag file may be stored in valid file 348 in storage 338 in transition team server 332 in the illustrative example of FIG. 3.

Figure 6:
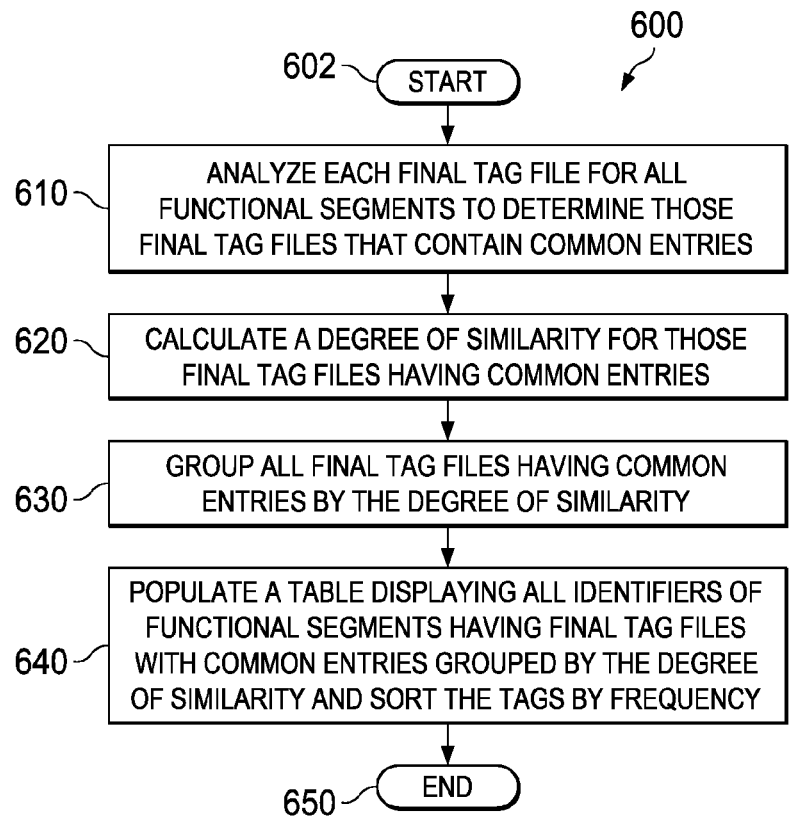
FIG. 6 is a flowchart of a calculation process in accordance with the illustrative embodiments.

FIG. 6 is a flowchart of an identification process in accordance with the illustrative embodiments. Identification process 600 may be part of application 352 in storage 338 of transition team server 332 in the illustrative example of FIG. 3. Identification process 600 starts (step 602) and analyzes each final tag file for all functional segments to determine those final tag files that contain common entries (step 610). In an illustrative example, two final tag files containing common entries may be:
Subroutine A: {calculation, report, query, dialog}
Subroutine B: {calculation, dialog, convert, export, wizard}

Identification process 600 may be part of application 352 in storage 338 in transition team server 332 in FIG. 3. Identification process 600 calculates a degree of similarity for those final tag files having common entries (step 620). The illustrative embodiments recognize and take into account that the greater the number of tags in common, the higher the "semantic strength" of that relationship. Percentages can also be assigned between subroutines to show the degree of similarity. In an illustrative example, Subroutine A and Subroutine B have a 44% similarity because there are nine terms in both final tag fields and four terms in common. Four divided by nine equals forty-four percent.

Identification process 600 groups all final tag files having common entries by the degree of similarity (step 630). All final tag files having common entries grouped by the degree of similarity may be stored in result file 348 of storage 338 of transition team server 332 in FIG. 3. Identification process 600 populates a table displaying all identifiers of functional segments having final tag files with common entries grouped by the degree of similarity and sorts the tags by frequency (step 640) and stops (step 650). An illustrative example of a table that may be formed from results in result file 348 in FIG. 3 is table 400 in the illustrative example of FIG. 4. The table may be saved to report file 354 of storage 338 in FIG. 3.

Figure 7:
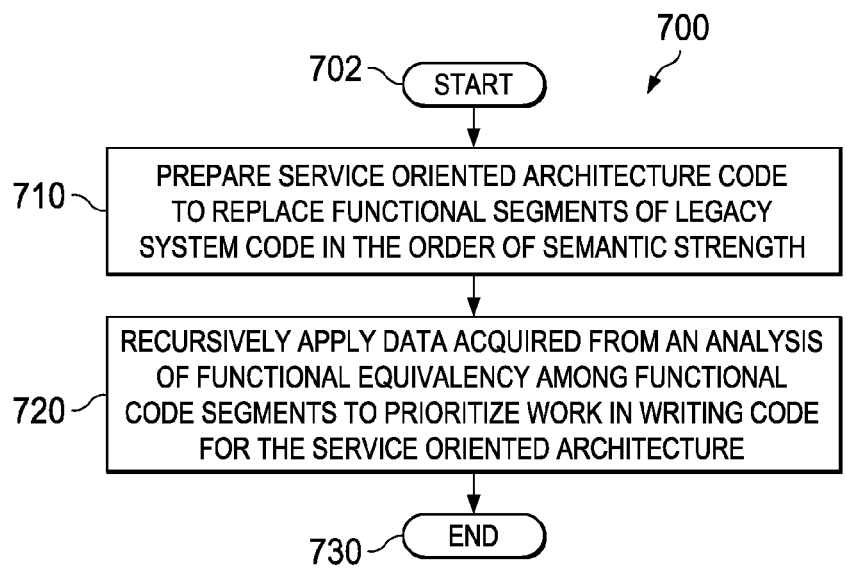
FIG. 7 is a flowchart of a recursive process in accordance with the illustrative embodiments.

FIG. 7 is a flowchart of a prioritization process in accordance with the illustrative embodiments. Prioritization process 700 may be part of application 352 in storage 338 in the illustrative example of FIG. 3. Prioritization process 700 starts (step 702) and may prepare service oriented architecture code to replace functional segments of legacy system code in the order of semantic strength (step 710). Prioritization process 700 may recursively apply data acquired from an analysis of functional equivalency among functional code segments to prioritize work in writing code for the service oriented architecture (step 720) and stops (step 730).

The illustrative embodiments recognize and take into account that performing the operations described in the illustrative examples of FIGS. 5 and 6 may provide data applicable to future transitions of legacy systems and that by applying knowledge gained from one legacy system to the next legacy system may save additional time and expense in completing a transition as well as providing guidance for programmers developing replacement code for inefficient legacy functional segments.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be ran substantially concurrently, or the blocks may sometimes be ran in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable data storage medium providing program code for use by or in connection with a computer or any instruction running system. For the purposes of this description, a computer-usable or computer readable data storage medium can be any tangible apparatus that can store the program for use by or in connection with the instruction running system, apparatus, or device.

The medium can be an electronic, magnetic, optical, or semiconductor system (or apparatus or device). Examples of a computer-readable data storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or running program code will include at least one processor coupled directly or indirectly to memory elements through a system bus. The memory elements can include local memory employed during actual running of the program code, bulk storage, and cache memories which provide temporary storage of at least some program code in order to reduce the number of times code must be retrieved from bulk storage during running.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening non-public or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for identifying similar functional segments of code, the method comprising the steps of:
 a computer identifying a number of functionally equivalent segments in a number of lines of code by analyzing tag files associated with each of a number of functional segments in the number of lines of code;
 the computer accessing the number of lines of code containing the number of functional segments; and
 for each functional segment in the number of functional segments:
  the computer creating a set of tags for the functional segment by inserting all in-line comments, subroutine names, and file names in the functional segment into a tag file associated with the functional segment;
  the computer expanding all expandable abbreviations in the tag file into a full word; and
  the computer creating a reduced tag file by identifying all words in the tag file with a common root and replacing all of the words with the common root with a single word, wherein the single word is the common root.

2. The method of claim 1 further comprising the steps of:
 the computer ranking all entries in all reduced tag files by frequency of occurrence; and
 the computer selecting a number of highest ranking entries to create an active tag set.

3. The method of claim 2 further comprising the steps of:
 the computer identifying all functional segments with a reduced tag file containing an entry from the active tag set to create an active functional segments set.

4. The method of claim 3 further comprising the steps of:
 the computer analyzing each final tag file for each functional segments to determine final tag files that contain common entries; and
 the computer calculating a degree of similarity for final tag files that have common entries.

5. The method of claim 4 further comprising the steps of:
 the computer grouping all final tag files having common entries by the degree of similarity; and
 the computer populating a table displaying all identifiers of functional segments having final tag files with common entries grouped by the degree of similarity.

6. The method of claim 1 further comprising the steps of:
 the computer preparing service oriented architecture code to replace functional segments of legacy system code in the order of semantic strength; and
 the computer recursively applying data acquired from an analysis of functional equivalency among functional code segments, to prioritize work in writing code for a service oriented architecture.

7. A computer program product for identifying similar functional segments of code, the computer program product comprising:
 one or more computer-readable tangible storage devices;
 program instructions, stored on at least one of the one or more storage devices, to identify a number of functionally equivalent segments in a number of lines of code by analyzing a number of tag files associated with each of a number of functional segments in the number of lines of code;
 program instructions, stored on at least one of the one or more storage devices, to access the number of lines of code containing the number of functional segments; and
 program instructions, stored on at least one of the one or more storage devices, to, for each functional segment in the number of functional segments:
  create a set of tags for the functional segment by inserting all in-line comments, subroutine names, and file names in the functional segment into a tag file associated with the functional segment;
  expand all expandable abbreviations in the tag file into a full word; and
  create a reduced tag file by identifying all words in the tag file with a common root and replacing all of the words with the common root with a single word, the single word being the common root.

8. The computer program product of claim 7 further comprising:
 program instructions, stored on at least one of the one or more storage devices, to rank all entries in all reduced tag files by frequency of occurrence; and
 program instructions, stored on at least one of the one or more storage devices, to select a number of highest ranking entries to create an active tag set.

9. The computer program product of claim 8 further comprising:
 program instructions, stored on at least one of the one or more storage devices, to identify all functional segments with a reduced tag file containing an entry from the active tag set to create an active functional segments set.

10. The computer program product of claim 9 further comprising:
 program instructions, stored on at least one of the one or more storage devices, to analyze each final tag file for each functional segments to determine final tag files that contain common entries; and
 program instructions, stored on at least one of the one or more storage devices, to calculate a degree of similarity for final tag files having common entries.

11. The computer program product of claim 10 further comprising:
 program instructions, stored on at least one of the one or more storage devices, to group all final tag files having common entries by the degree of similarity; and
 program instructions, stored on at least one of the one or more storage devices, to populate a table displaying all identifiers of functional segments having final tag files with common entries grouped by the degree of similarity.

12. The computer program product of claim 11 further comprising:
 program instructions, stored on at least one of the one or more storage devices, to prepare service oriented architecture code to replace functional segments of legacy system code in the order of semantic strength; and
 program instructions, stored on at least one of the one or more storage devices, to recursively apply data acquired from an analysis of functional equivalency among functional code segments, to prioritize work in writing code for a service oriented architecture.

13. A computer system for identifying similar functional segments of code for reuse, the computer system comprising:
 one or more processors, one or more computer-readable memories and one or more computer-readable tangible storage devices;
 program instructions, stored on at least one of the one or more storage devices for execution by at least one of the one or more processors via at least one of the one or more memories, to identify a number of functionally equivalent segments in a number of lines of code by analyzing a number of tag files associated with each of a number of functional segments in the number of lines of code;

program instructions, stored on at least one of the one or more storage devices for execution by at least one of the one or more processors via at least one of the one or more memories, to access the number of lines of code containing the number of functional segments; and program instructions, stored on at least one of the one or more storage devices for execution by at least one of the one or more processors via at least one of the one or more memories, to, for each functional segment in the number of functional segments:

create a set of tags for the functional segment by inserting all in-line comments, subroutine names, and file names in the functional segment into a tag file associated with the functional segment;

expand all expandable abbreviations in the tag file into a full word; and create a reduced tag file by identifying all words in the tag file with a common root and replacing all of the words with the common root with a single word, the single word being the common root.

14. The computer system of claim 13 further comprising:
program instructions, stored on at least one of the one or more storage devices for execution by at least one of the one or more processors via at least one of the one or more memories, to rank all entries in all reduced tag files by frequency of occurrence; and program instructions, stored on at least one of the one or more storage devices for execution by at least one of the one or more processors via at least one of the one or more memories, to select a number of highest ranking entries to create an active tag set.

15. The computer system of claim 14 further comprising:
program instructions, stored on at least one of the one or more storage devices for execution by at least one of the one or more processors via at least one of the one or more memories, to identify all functional segments with a reduced tag file containing an entry from the active tag set to create an active functional segments set.

16. The computer system of claim 15 further comprising:
program instructions, stored on at least one of the one or more storage devices for execution by at least one of the one or more processors via at least one of the one or more memories, to analyze each final tag file for each functional segments to determine final tag files that contain common entries; and program instructions, stored on at least one of the one or more storage devices for execution by at least one of the one or more processors via at least one of the one or more memories, to calculate a degree of similarity for final tag files having common entries.

17. The computer system of claim 16 further comprising:
program instructions, stored on at least one of the one or more storage devices for execution by at least one of the one or more processors via at least one of the one or more memories, to group all final tag files having common entries by the degree of similarity; and program instructions, stored on at least one of the one or more storage devices for execution by at least one of the one or more processors via at least one of the one or more memories, to populate a table displaying all identifiers of functional segments having final tag files with common entries grouped by the degree of similarity sort the tags by frequency.

18. The computer system of claim 17 further comprising:
program instructions, stored on at least one of the one or more storage devices for execution by at least one of the one or more processors via at least one of the one or more memories, to prepare service oriented architecture code to replace functional segments of legacy system code in the order of semantic strength; and program instructions, stored on at least one of the one or more storage devices for execution by at least one of the one or more processors via at least one of the one or more memories, to recursively apply data acquired from an analysis of functional equivalency among functional code segments, to prioritize work in writing code for the service oriented architecture.

\* \* \* \* \*